United States Patent
Bijl et al.

(10) Patent No.: US 11,781,851 B2
(45) Date of Patent: Oct. 10, 2023

(54) ALIGNMENT TOOL

(71) Applicants: Darrell Bijl, Arras (CA); Stephanie Bijl, Arras (CA)

(72) Inventors: Darrell Bijl, Arras (CA); Stephanie Bijl, Arras (CA)

( * ) Notice: Subject to any disclaimer, the term of this patent is extended or adjusted under 35 U.S.C. 154(b) by 278 days.

(21) Appl. No.: 17/192,157

(22) Filed: Mar. 4, 2021

(65) Prior Publication Data
US 2021/0278193 A1 Sep. 9, 2021

Related U.S. Application Data

(60) Provisional application No. 62/985,226, filed on Mar. 4, 2020.

(51) Int. Cl.
*G01B 5/25* (2006.01)
*G01B 5/00* (2006.01)

(52) U.S. Cl.
CPC ............. *G01B 5/25* (2013.01); *G01B 5/0004* (2013.01)

(58) Field of Classification Search
CPC ........ G01B 5/25; G01B 5/0004; E02D 13/04; E02D 27/12
See application file for complete search history.

(56) References Cited

U.S. PATENT DOCUMENTS

| | | |
|---|---|---|
| 3,250,009 A | 5/1966 | Oseka |
| 3,890,717 A * | 6/1975 | Haun .................... G01C 15/00 33/1 LE |
| 4,057,903 A | 11/1977 | Cantera |
| 4,202,108 A | 5/1980 | Adams, Jr. et al. |
| 4,924,579 A | 5/1990 | Berendsen |
| 5,492,294 A * | 2/1996 | Haeussler ............. F16B 7/0493 248/300 |
| 5,615,844 A | 4/1997 | Bosch |
| 5,657,548 A | 8/1997 | Kellar, Sr. |
| 5,778,546 A | 7/1998 | Williamson |
| 6,108,877 A * | 8/2000 | Anscher ..................... A45F 3/04 24/481 |
| 6,490,803 B1 * | 12/2002 | Butters ............... E04G 21/1833 33/405 |
| 7,051,446 B2 * | 5/2006 | Moss ....................... B25H 7/00 33/414 |
| 7,299,559 B2 * | 11/2007 | Moss ....................... B25H 7/00 33/640 |
| 7,513,054 B2 * | 4/2009 | Moss ..................... E04D 15/00 33/640 |
| 8,567,079 B2 | 10/2013 | Cerwin |
| 8,820,716 B1 * | 9/2014 | Silver ................... E04H 17/266 256/37 |
| 10,976,160 B2 * | 4/2021 | Klein ........................ E06B 1/60 |
| 2004/0006935 A1 | 1/2004 | Moorhead |
| 2016/0252349 A1 | 9/2016 | Egan |
| 2019/0041208 A1 * | 2/2019 | Klein ..................... G01C 15/10 |
| 2021/0278193 A1 * | 9/2021 | Bijl ......................... E02D 27/12 |
| 2021/0372200 A1 * | 12/2021 | Walsh ..................... E06C 7/186 |

FOREIGN PATENT DOCUMENTS

GB 2328704 A 3/1999

* cited by examiner

*Primary Examiner* — Yaritza Guadalupe-McCall
(74) *Attorney, Agent, or Firm* — McMillan LLP

(57) ABSTRACT

An alignment tool for a pile cap is disclosed, wherein the alignment tool comprises: a tensioner configured to apply tension to a cord; a pile cap fastener coupled to the tensioner; and a cord guide coupled to the fastener; wherein the cord guide is configured to guide a cord under tension by the tensioner.

19 Claims, 15 Drawing Sheets

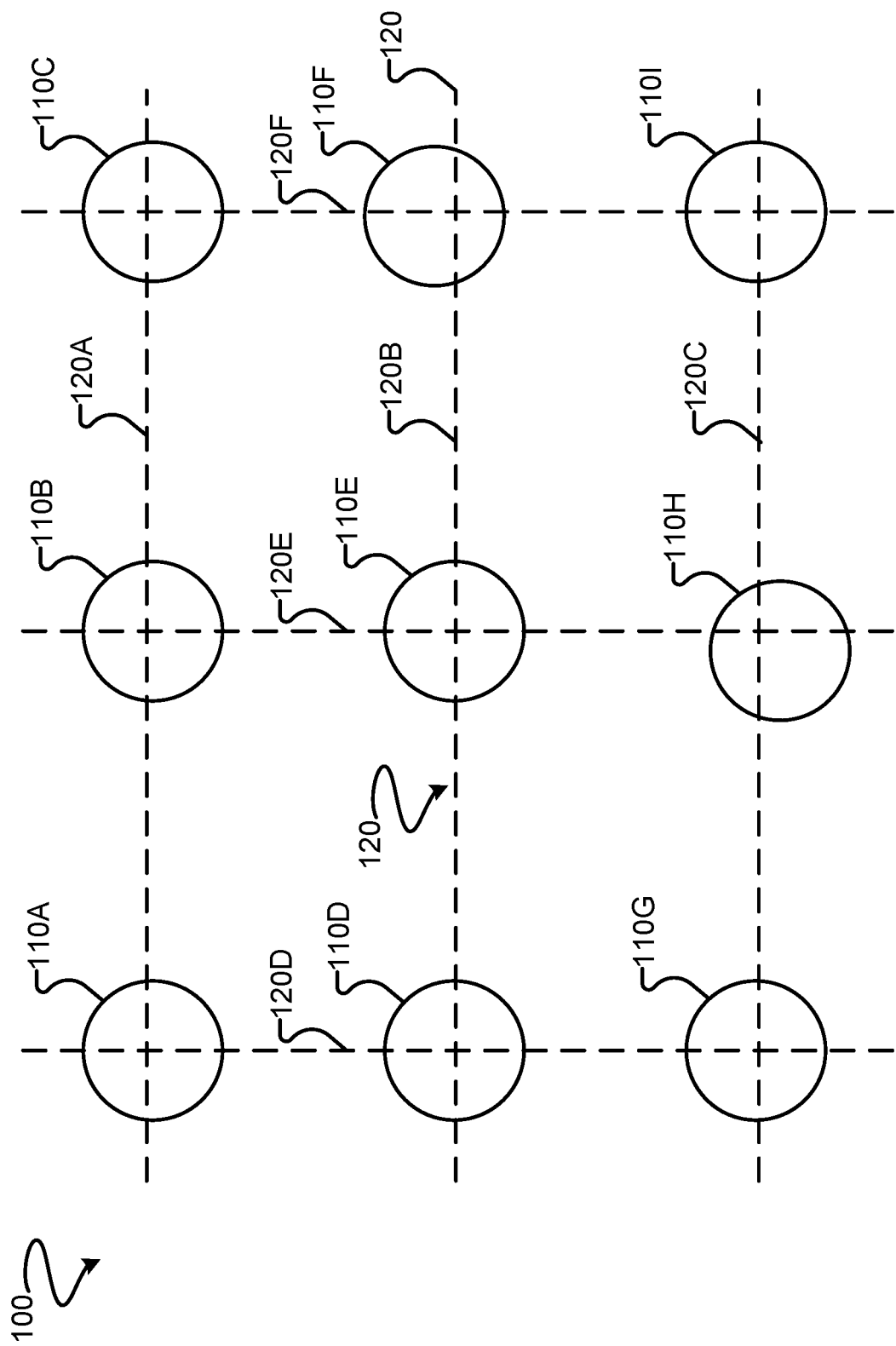
FIG. 1A – PRIOR ART

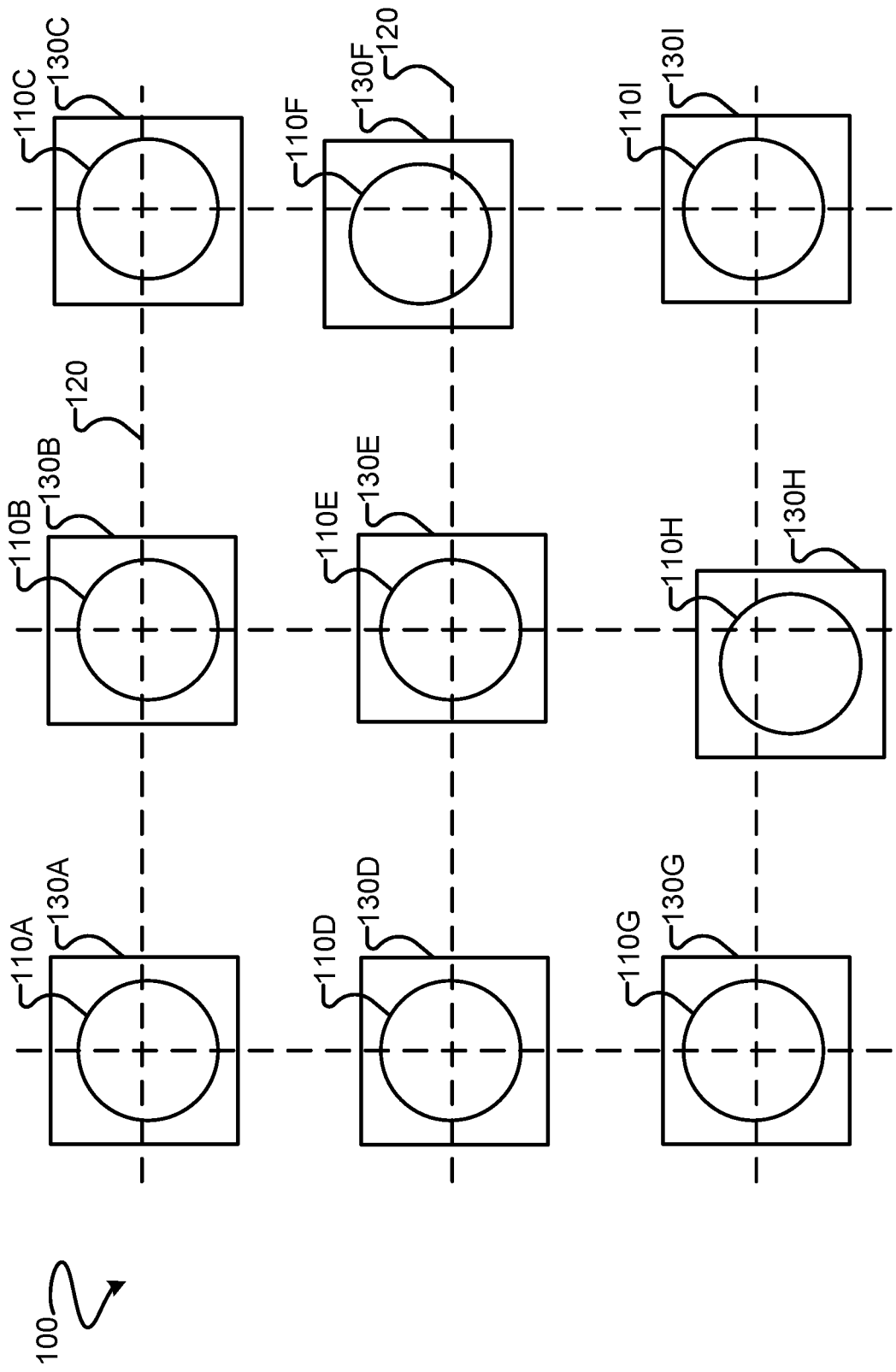
FIG. 1B – PRIOR ART

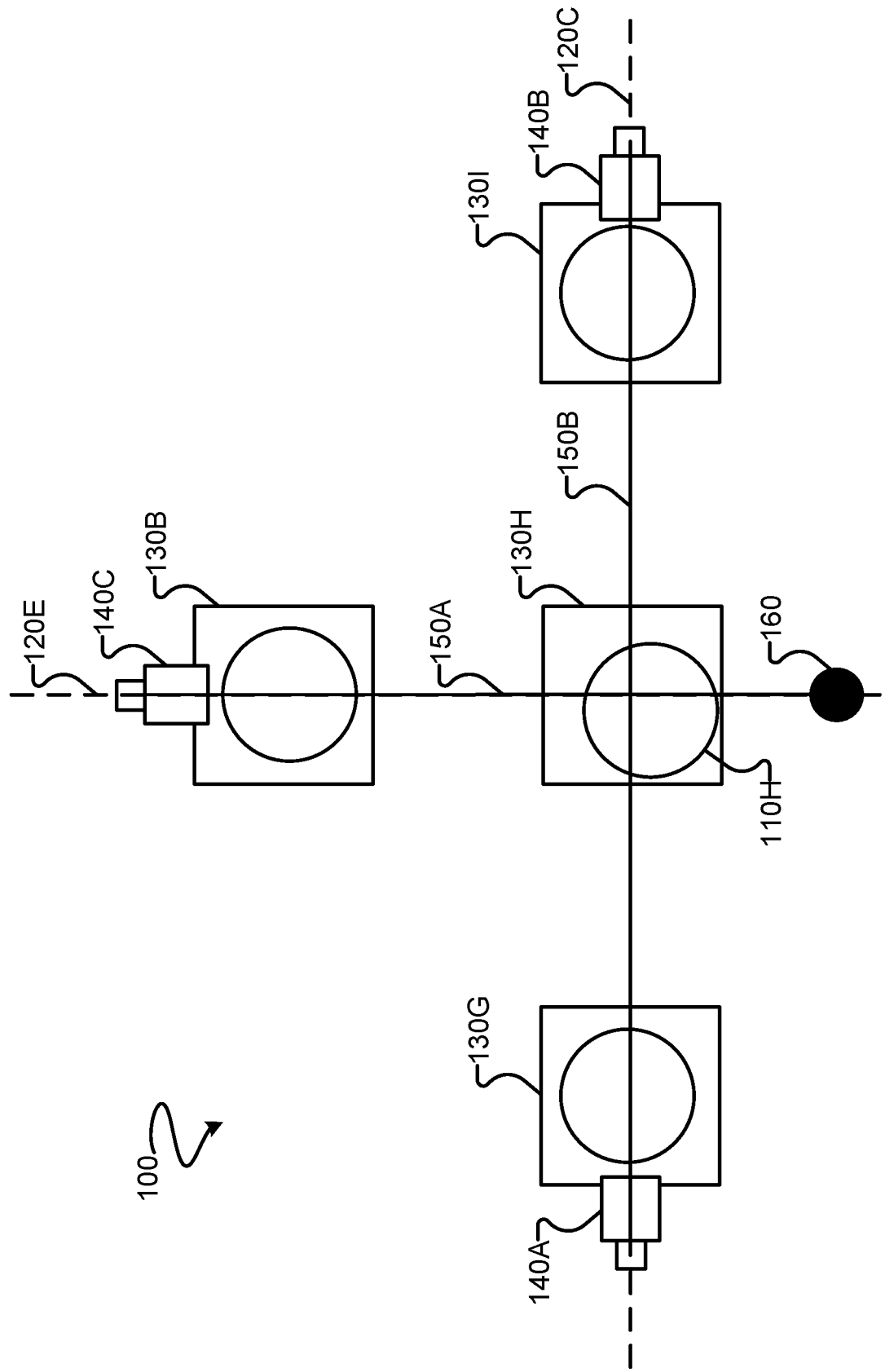

ALIGNMENT TOOL

CROSS-REFERENCE TO RELATED APPLICATION

This application claims priority from U.S. application No. 62/985,226 filed 4 Mar. 2020 and entitled ALIGNMENT TOOL which is hereby incorporated herein by reference for all purposes. For purposes of the United States of America, this application claims the benefit under 35 U.S.C. § 119 of U.S. application No. 62/985,226 filed 4 Mar. 2020 and entitled ALIGNMENT TOOL.

TECHNICAL FIELD

The present disclosure is directed to an alignment tool. More particularly, the present disclosure is directed to an alignment tool for alignment of foundation pile caps.

BACKGROUND

Piles are often used in foundations for structures. To form the base of a foundation, multiple piles are driven into the ground. Pile caps are then mounted to the piles, and the remainder of the foundation is constructed upon the pile caps. A structure is then constructed upon the foundation.

The arrangement of piles is integral to the construction of the remainder of a foundation. For example, an even arrangement of piles may facilitate an even distribution of loads from the structure upon the piles. As a further example, piles may be arranged more densely in areas of higher loads, and more sparsely in areas of lower loads.

During construction of a structure, piles are driven into the ground according to a planned arrangement. However, given the nature of pile driving, the position of installed piles may deviate from the planned arrangement by more than an allowable tolerance.

Pile caps are mounted upon the installed piles and can be used to compensate for a deviation in positon of installed piles from the planned arrangement. To correctly mount pile caps, each pile cap must be aligned with other installed pile caps.

Existing methods and tools for aligning pile caps include anchoring cords using clamps such as vice grips.

Many of the existing methods and tools for aligning pile caps are cumbersome and/or inaccurate. There is a general desire for accurate and easy alignment of pile caps.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides an alignment tool for a pile cap, the alignment tool comprising: a tensioner configured to apply tension to a cord; a pile cap fastener coupled to the tensioner; and a cord guide coupled to the fastener; wherein the cord guide is configured to guide a cord under tension by the tensioner.

One aspect of the invention provides an alignment tool comprising: a body; a first jaw coupled to the body and having a first side and a second side opposed to the first side; a second jaw coupled to the body opposing the second side of the first jaw and defining a threaded aperture; a spacer hingedly coupled to the second side of the first jaw; a thumb screw screwed through the threaded aperture; a drum mounted to the body, wherein the drum is rotatable about a first axis and slideable along the first axis; a cord retention member coupled to the drum; a channel defined by the first side of the first jaw and substantially perpendicular to the first axis; a first knob coupled to a first end of the drum; and a projection coupled to the first knob, wherein the projection extends from the first knob towards the body and along the first axis; wherein the body defines a second aperture configured to receive the projection when the first knob is slid along the first axis towards the body and to resist rotation of the drum about the first axis when the projection is received within the second aperture.

One aspect of the invention provides an alignment tool comprising: a body; a first jaw coupled to the body and having a first side and a second side opposed to the first side; a second jaw coupled to the body opposing the second side of the first jaw and defining an aperture and a recess intersecting the aperture; a spacer hingedly coupled to the second side of the first jaw; a nut inside the recess and aligned with the aperture; a bolt passing through the aperture and screwed through the bolt; a drum mounted to the body, wherein the drum is rotatable about a first axis and slideable along the first axis; a cord retention member coupled to the drum; a channel defined by the first side of the first jaw and substantially perpendicular to the first axis; a first knob coupled to a first end of the drum; a knob projection coupled to the first knob having six corners and forming a hexagon extending towards the body; and a body projection coupled to the body having six corners and forming a hexagon extending towards the first knob; wherein the knob projection is configured to engage the body projection by rotating the drum to align the corners of the knob projection with the corners of the body projection, and axially sliding the drum to slid the knob projection within the body projection.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIGS. 1A and 1B are schematic views of a prior art foundation comprising multiple piles.

FIGS. 1C and 1D are schematic views of a foundation comprising multiple piles according to an example embodiment.

DESCRIPTION

Figure 1C:
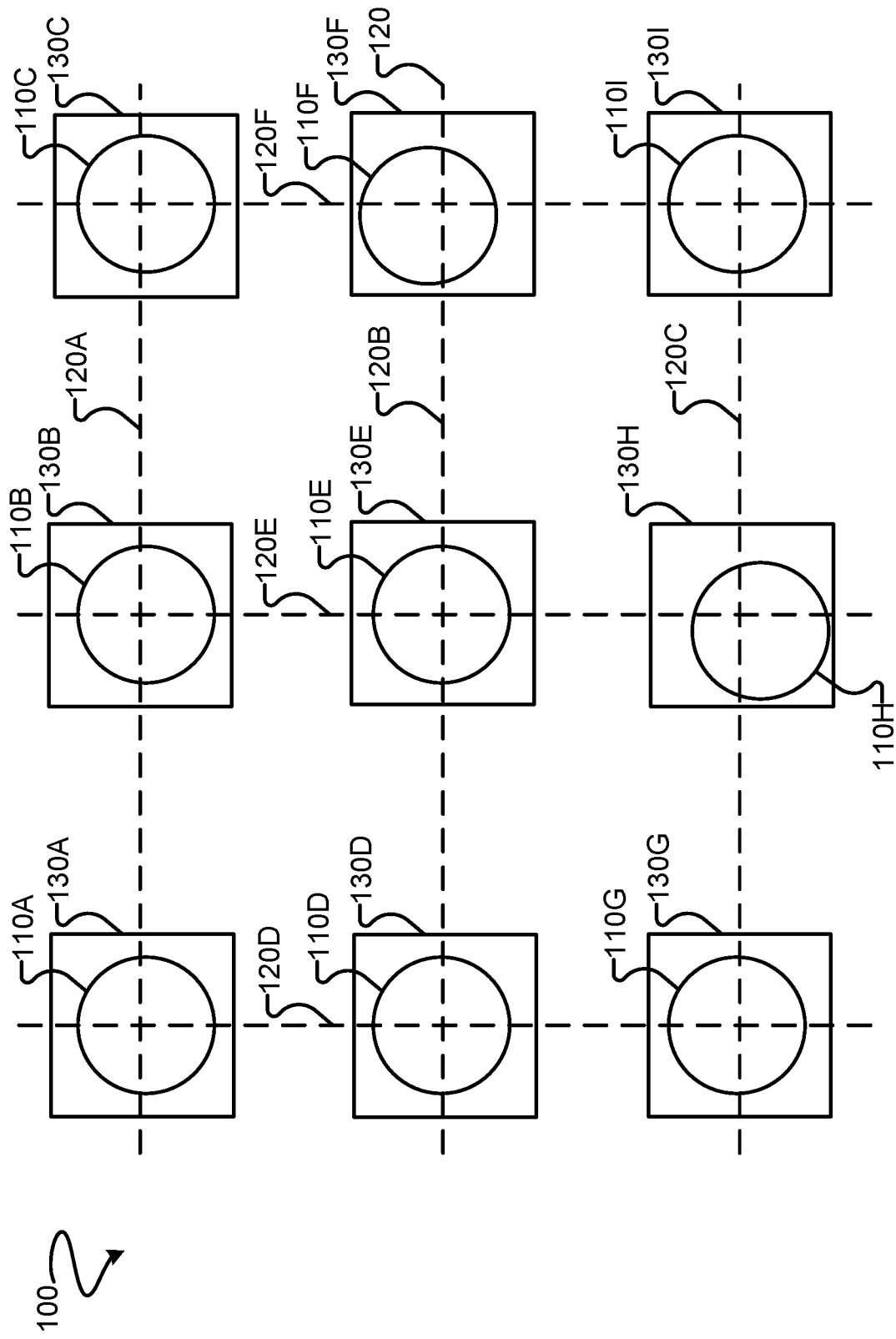

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

FIG. 1A is a schematic top view of foundation 100 of a structure. FIG. 1A depicts an embodiment of foundation 100 comprising twelve piles 110A through 110I (collectively piles 110). However, foundation 100 may comprise any number of piles 110.

Piles 110 are driven into the ground, for example by a pile driver. Piles 110 of foundation 100 are driven into the ground generally according to a pile layout. FIG. 1A depicts an embodiment of a pile layout comprising a grid 120. However, the pile layout may comprise any arrangement of piles.

Grid 120 comprises a first set of parallel grid lines 120A, 120B, and 120C, and a second set of parallel grid lines 120D, 120E, and 120F. Each of grid lines 120A, 120B, and 120C is perpendicular to each of grid lines 120D, 120E, and 120F.

Grid lines 120A, 120B, and 120C form intersections with grid lines 120D, 120E, and 120F of grid 120. Piles 110 are driven into the ground generally aligned with the intersections of grid 120.

Given the nature of pile driving, as piles 110 are driven into the ground, piles 110 may become unaligned with the intersections of grid 120. For example, as depicted in FIG. 1A, the centers of driven piles 110F and 110H are unaligned with the intersections of grid 120.

To construct a structure upon piles 110, pile caps are mounted to piles 110, and the remainder of the structure is constructed upon the pile caps.

FIG. 1B depicts pile caps 130A through 130I (collectively pile caps 130) mounted upon piles 110 and centered with piles 110. As depicted in FIG. 1B, because pile caps 130F and 130H are respectively centered upon piles 110F and 110H, pile caps 130F and 130H are unaligned with the intersections of grid 120 because piles 110F and 110H are unaligned with the intersections of grid 120.

FIG. 1C depicts pile caps 130F and 130H respectively mounted upon piles 110F and 110H, wherein pile caps 130F and 130H are not centered upon pile caps 130F and 130H, but instead aligned with the intersections of grid 120.

For example, to align pile cap 130F with an intersection of grid 120, a center of pile cap 130F is aligned with an intersection of grid line 120F and grid line 120B. To align pile cap 130H with an intersection of grid 120, a center of pile cap 130H is aligned with an intersection of grid line 120C and grid line 120E.

FIG. 1D is a partial view of foundation 100 depicting alignment tools 140A, 140B and 140C (collectively alignment tools 140) respectively fastened to pile caps 130G, 130B and 130I. Each of alignment tools 140 comprise a cord guide (described below) for directing a cord.

Alignment tools 140 are used to draw cords 150A and 150B respectively along grid lines 120E and 120C. By drawing cords 150A and 150B along grid lines 120E and 120C, pile cap 130H can be centered with an intersection of cords 150A and 150B, thereby aligning pile cap 130H with an intersection of grid 120.

Cord 150B is drawn along grid line 120C by a cooperation of alignment tools 140A and 140B. A cord guide of alignment tool 140A is aligned with grid line 120C, and alignment tool 140A is fastened to pile cap 130G. Similarly, a cord guide of alignment tool 140B is aligned with grid line 120C, and alignment tool 140B is fastened to pile cap 130I. A first end of cord 150B is tensioned by alignment tool 140A, and a second end of cord 150B is tensioned by alignment tool 140B. The tensioned cord 150B is drawn along grid line 120C by a cooperation of the cord guides of alignment tools 140A and 140B.

Cord 150A is drawn along grid line 120E by a cooperation of alignment tool 140C and anchor point 160. Anchor point 160 comprises any feature lying along grid line 120E which may receive a first end of cord 150A. For example, anchor point 160 may comprise another feature of the foundation, or a feature of the construction site, for example a fence.

A cord guide of alignment tool 140C is aligned with grid line 120E, and alignment tool 140C is fastened to pile cap 130B. A first end of cord 150A is coupled to anchor point 160, and a second end of cord 150A is tensioned by alignment tool 140C. The tensioned cord 150A is drawn along grid line 120C by the cord guide of alignment tool 140C.

By drawing cord 150A along grid line 120E and cord 150B along grid line 120C, the intersection of grid line 120E and grid line 120C may be easily and accurately identified. Once the intersection of grid line 120E and grid line 120C is identified, pile cap 130H may be centered with the intersection of grid line 120E and grid line 120C. Pile cap 130H may then be mounted to pile 110H in closer alignment with an intersection of grid 120 than if pile cap 130H were centered with pile 110H.

Figure 2:
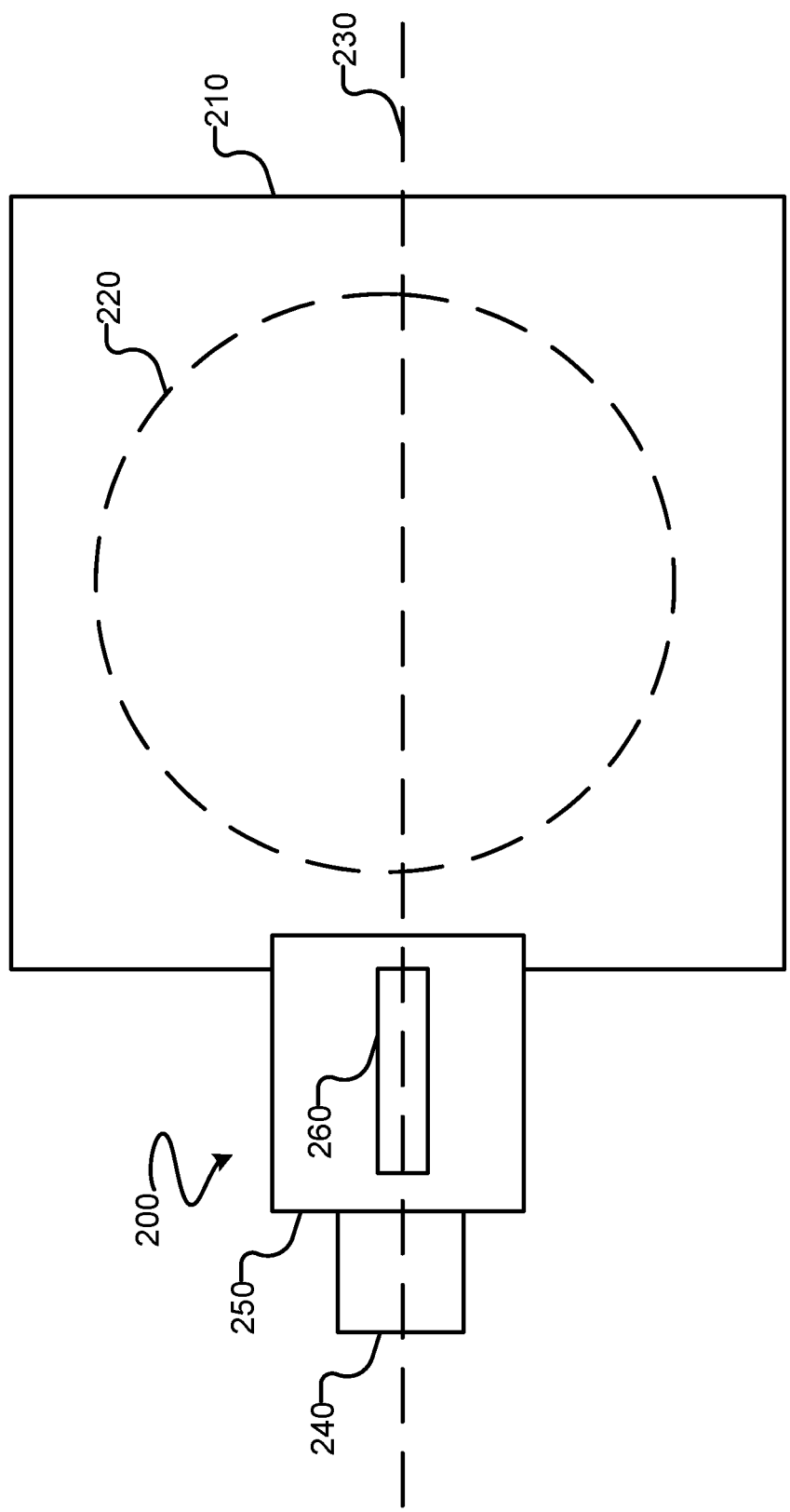
FIG. 2 is a schematic view of an alignment tool according to an example embodiment coupled to a pile cap.

FIG. 2 is a schematic view of an alignment tool 200 according to an example embodiment fastened to pile cap 210 of pile 220. Alignment tool 200 comprises tensioner 240, pile cap fastener 250, and cord guide 260. To fasten alignment tool 200 to pile cap 210, cord guide 260 is aligned with grid line 230, and alignment tool 200 is fastened to pile cap 210 by pile cap fastener 250. A first end of a cord (not shown) is anchored a distance from alignment tool 200 along grid line 230, and a second end of the cord is fastened to tensioner 240. Tensioner 240 applies tension to the cord, and cord guide 260 guides the tensioned cord along grid line 230. In some embodiments, tensioner 240 may comprise a winch.

Figure 3A:
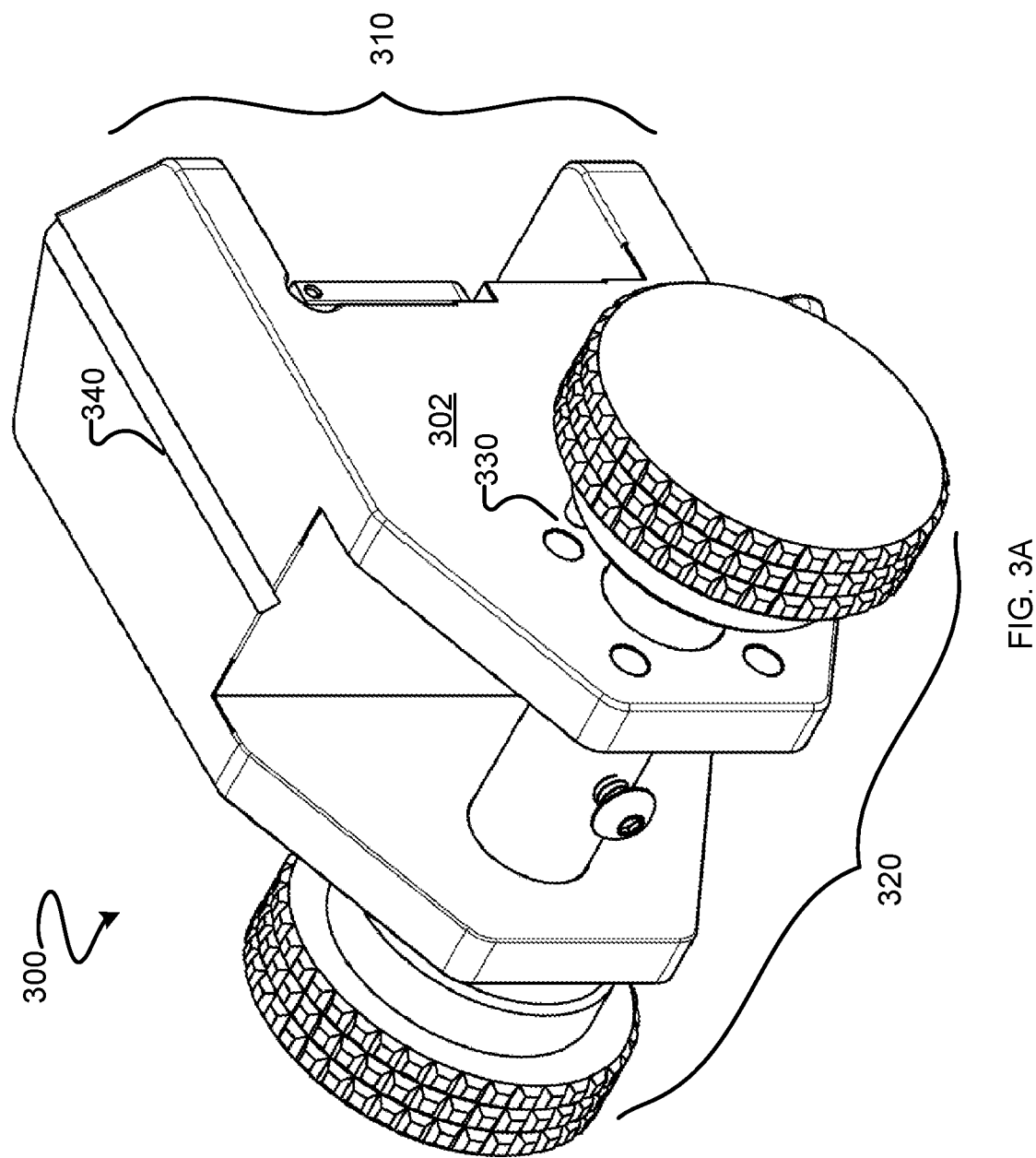
FIGS. 3A and 3B are perspective views of an alignment tool according to an example embodiment.
Figure 3B:
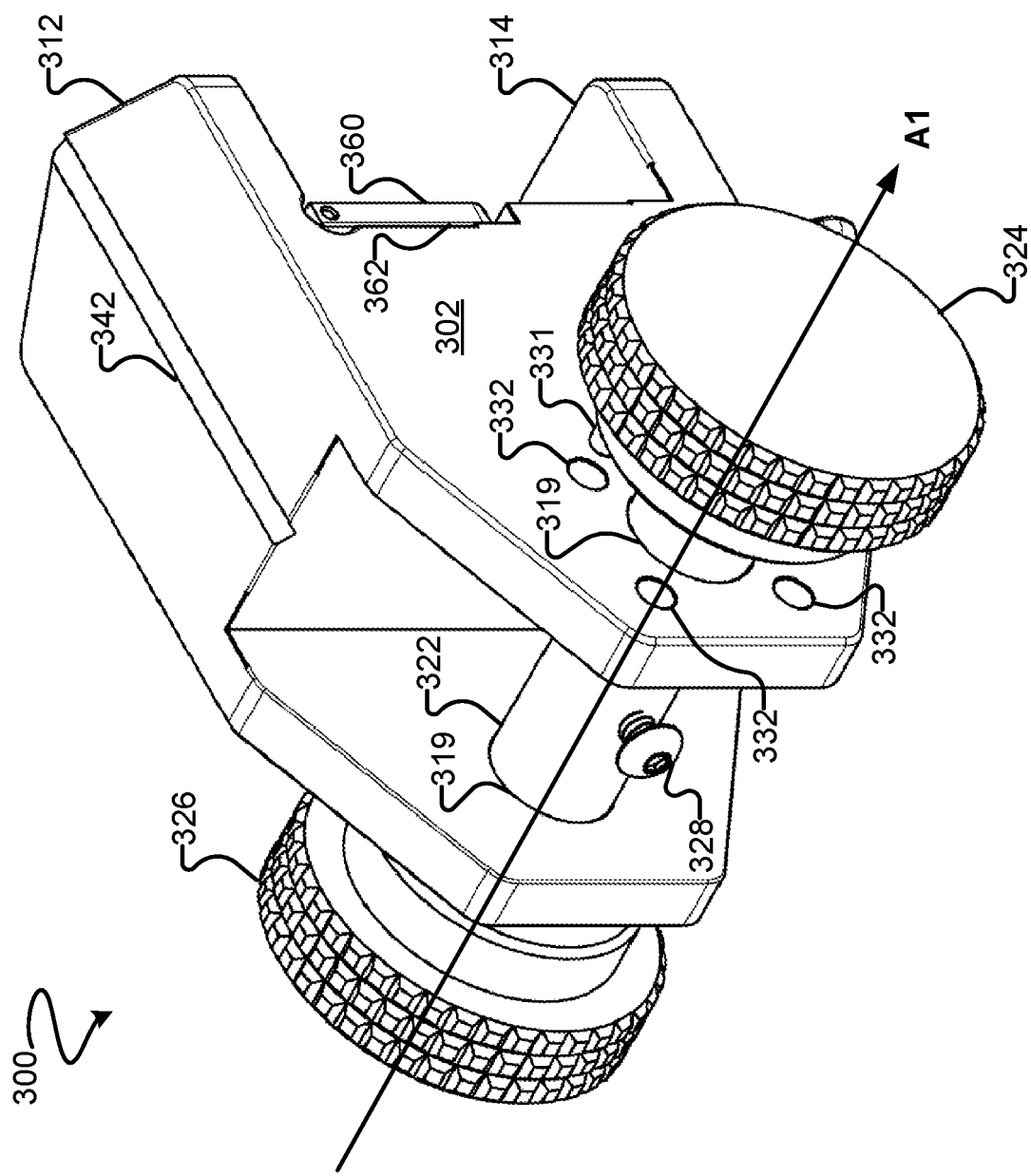

FIGS. 3A and 3B are perspective views of an alignment tool 300 according to a further example embodiment. Alignment tool 300 comprises body 302, pile cap fastener 310, tensioner 320, and cord guide 340.

Pile cap fastener 310 comprises first jaw 312 and second jaw 314 coupled to body 302. First jaw 312 opposes second jaw 314. First jaw 312 and second jaw 314 are configured to receive a pile cap there-between. One or both of first jaw 312 and second jaw 314 are configured to apply an inward force towards a received pile cap. By applying a force on a received pile cap, pile cap fastener 310 fastens alignment tool 300 to the pile cap.

In some embodiments, pile cap fastener 310 may comprise a thumb screw, wherein the thumb screw applies an inward force. For example, second jaw 314 may define a threaded aperture, and pile cap fastener 310 may comprise a screw screwed through the threaded aperture, for example a thumb screw.

Figure 3C:
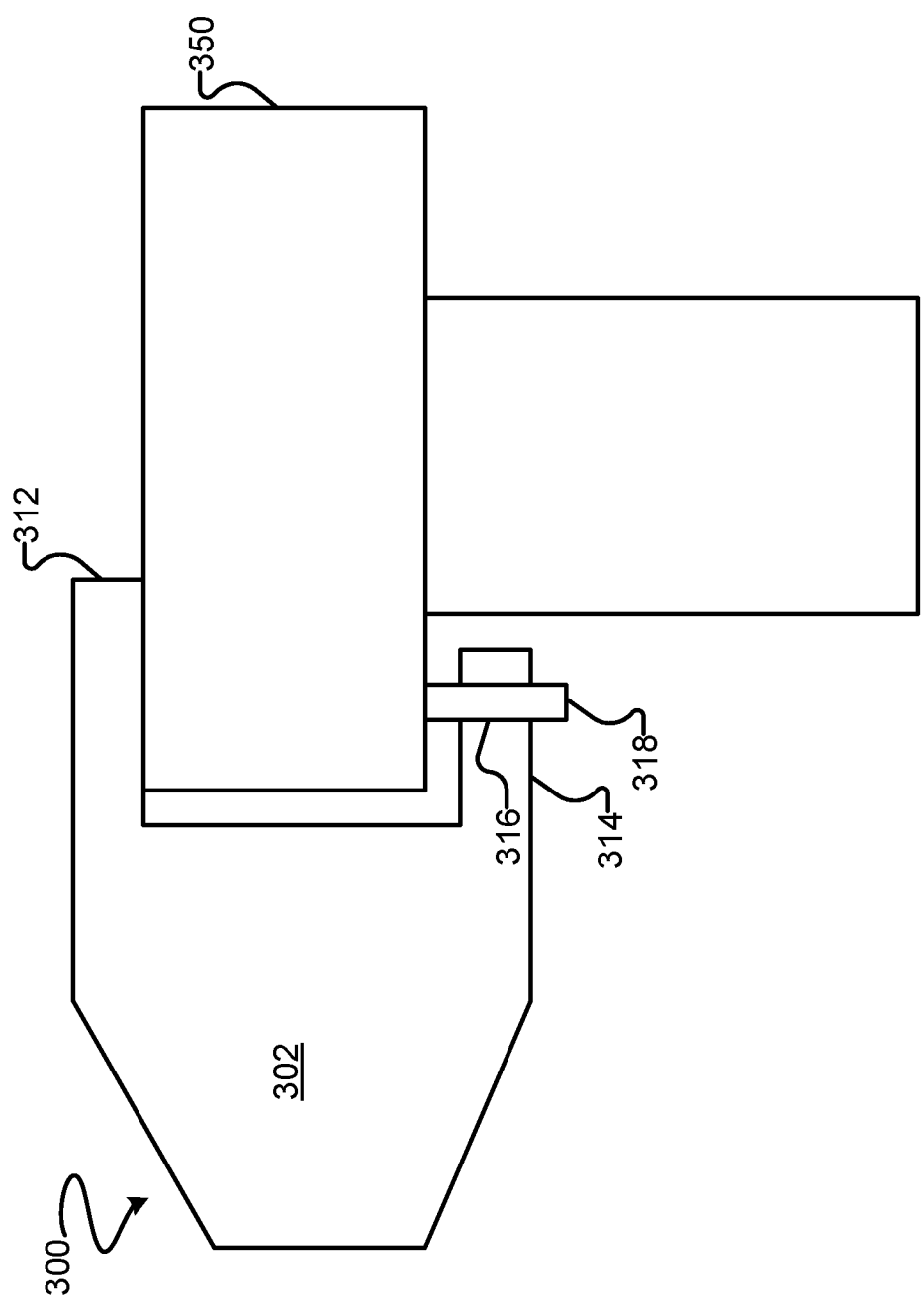
FIG. 3C is a schematic side view of the alignment tool of FIGS. 3A and 3B fastened to a pile cap.
Figure 3D:
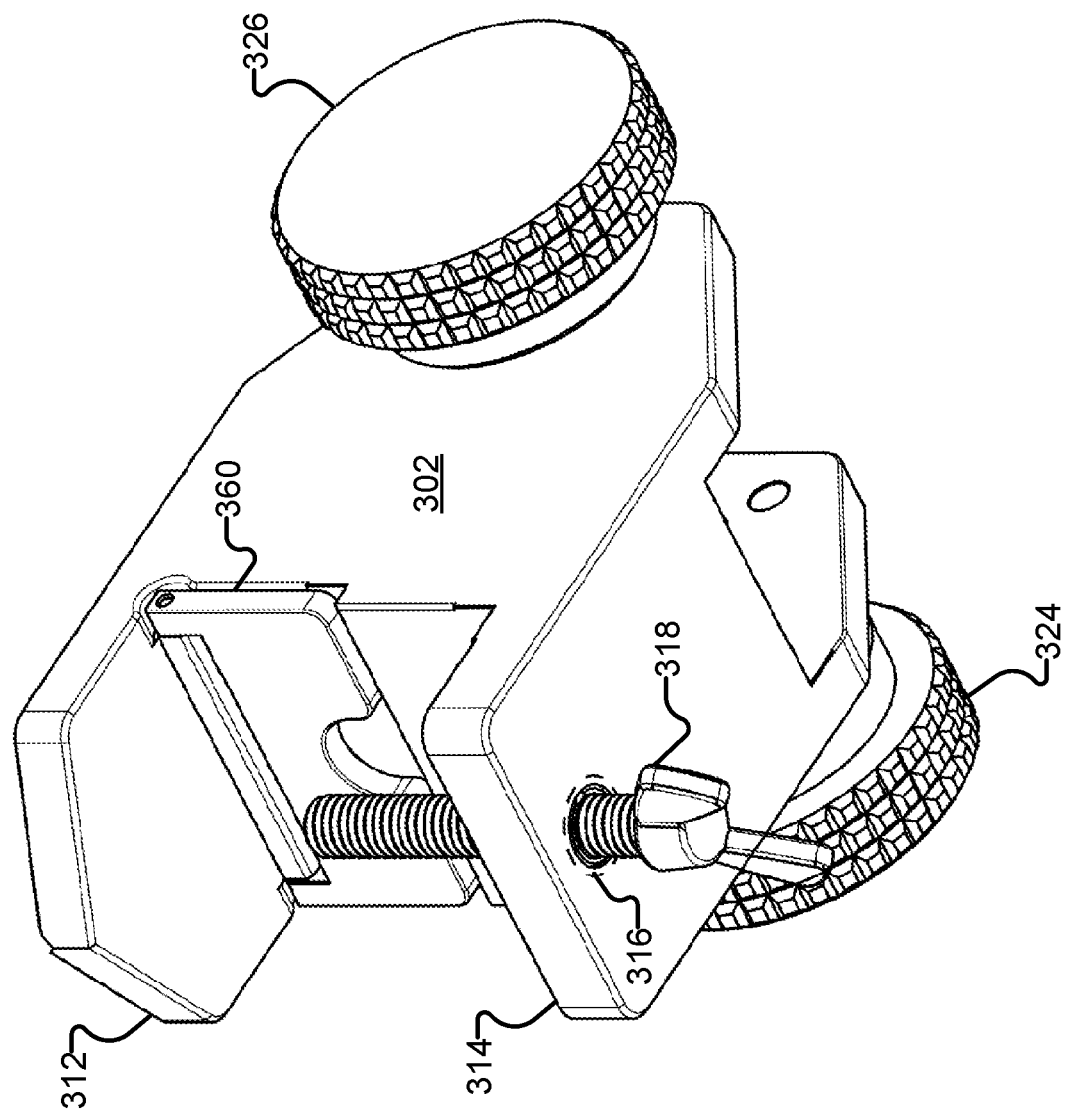
FIG. 3D is a further perspective view of the alignment tool depicted in FIGS. 3A and 3B.
Figure 3E:
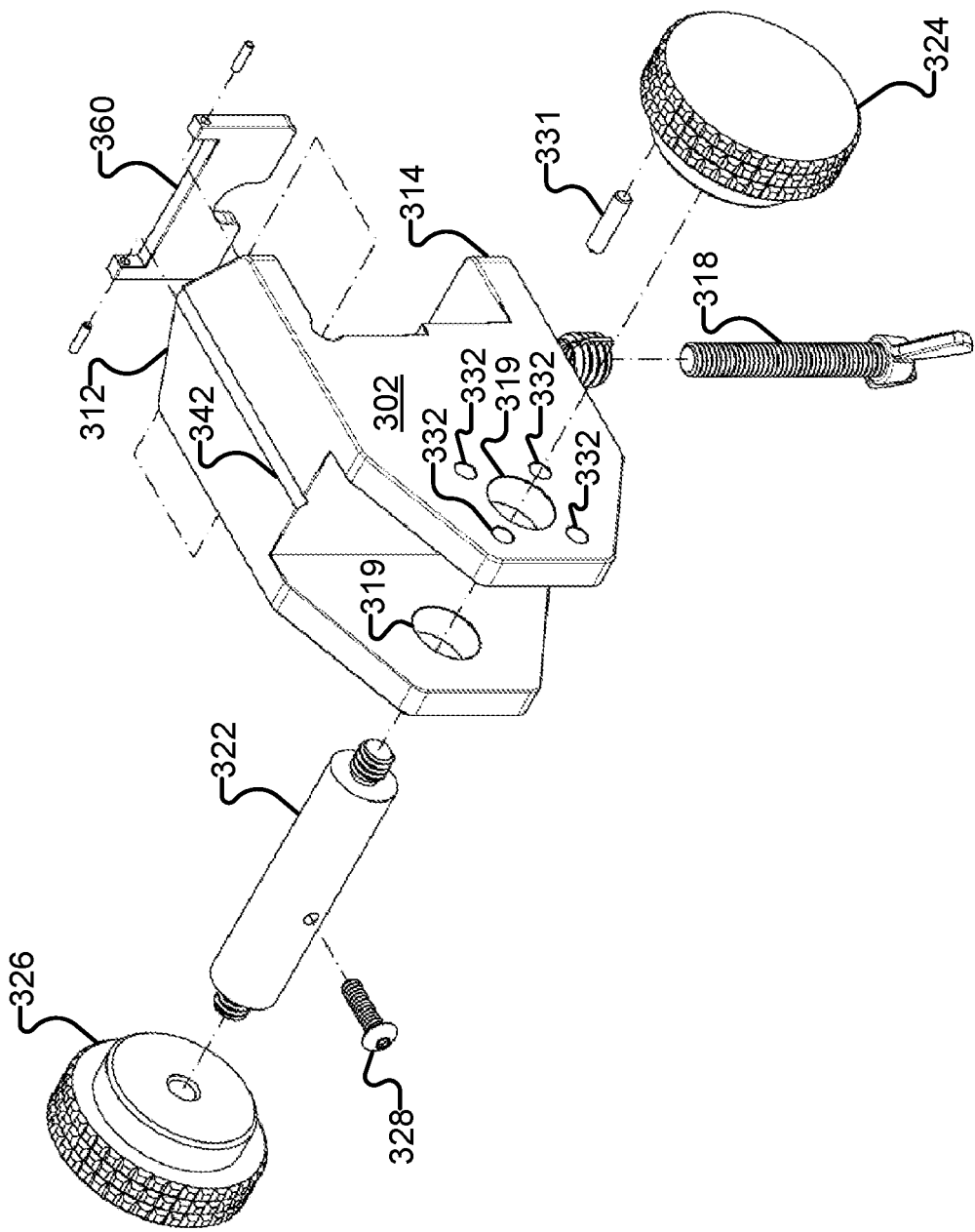
FIG. 3E is an exploded view of the alignment tool depicted in FIGS. 3A and 3B.

FIG. 3C depicts a schematic view of alignment tool 300 coupled to pile cap 350. Second jaw 314 defines threaded aperture 316. Pile cap fastener 310 comprises thumb screw 318 screwed through threaded aperture 316.

Pile cap 350 is received between first jaw 312 and second jaw 314. Thumb screw 318 is then advanced through threaded aperture 316 towards pile cap 350 until thumb screw 318 contacts pile cap 350. Thumb screw 318 is then further advanced towards pile cap 350 to apply a force on pile cap 350, thereby coupling alignment tool 300 to pile cap 350.

In some embodiments, first jaw 312 is larger than second jaw 314. For example, first jaw 312 may extend further from body 302 than second jaw 314. In such embodiments, first jaw 312 may extend further along a top side of pile cap 350 than second jaw 314 extends along a bottom side of pile cap 350 when alignment tool 300 is coupled to pile cap 350.

Returning to FIGS. 3A and 3B, tensioner 320 comprises drum 322, first knob 324, second knob 326, cord retention member 328, and drum lock 330.

Drum 322 is rotatably mounted to body 302 to rotate about axis A1, and slide along axis A1. First knob 324 is mounted to a first end of drum 322, and second knob 326 is mounted to a second end of drum 322. Drum 322 may be rotated about axis A1 by rotating one or both of first knob 324 and second knob 326 about axis A1. Drum 322 may be slid along axis A1 by sliding one or both of first knob 324 and second knob 326 along axis A1.

In some embodiments, body 302 defines one or more drum apertures 319, and drum 322 is mounted through drum apertures 319. Drum 322 extends through drum apertures 319, and first knob 324 and second knob 326 are mounted to respective ends of drum 322 extending through drum apertures 319.

Cord retention member 328 fastens a cord to drum 322 so that rotation of drum 322 about axis A1 winds a fastened cord around drum 322. In some embodiments, cord retention member 328 comprises a member coupled to drum 322, for example a screw inserted partially into drum 322. Where cord retention member 328 comprises a screw, a cord may be wound about the screw and secured with a knot. Cord retention member 328 may further comprise an aperture through drum 322 and a cord may be fed through the aperture and secured with a knot.

Drum lock 330 locks rotation of drum 322 about axis A1. In some embodiments, drum lock 330 comprises a projection 331 mounted to first knob 324 and extending towards body 302. Body 302 defines one or more locking apertures 332. Locking apertures 332 are configured to receive projection 331 when knob 324 is slid along axis A1 towards body 302.

When projection 331 is inserted into one of locking apertures 332, drum 322 is locked against rotation about axis A1. Drum 322 may be released from a locked position by sliding first knob 324 along axis A1 away from body 302 to remove projection 331 from locking apertures 332. When projection 331 is free from locking apertures 332, drum 322 and first knob 324 are free to rotate about axis A1.

To tension a cord, the cord is wound around drum 322 until tension is applied to the cord by the winding of the cord, then rotation of drum 322 is locked by inserting projection 331 into one of locking apertures 332.

In some embodiments, body 302 defines a number of locking apertures 332 spaced equally about drum aperture 319. For example, body 302 may define four locking apertures 332 spaced apart by 90 degrees.

In some embodiments, drum 322 may be locked against rotation by one or more gears and/or teeth.

In some embodiments, cord guide 340 comprises channel 342 defined by a surface of first jaw 312. Channel 342 runs along first jaw 312 perpendicular to axis A1 and parallel to an opening between first jaw 312 and second jaw 314, so that a cord wound around drum 322 runs through channel 342.

In some embodiments channel 342 comprises a V-shaped groove. In some embodiments, cord guide 340 comprises one or more eyelets secured to first jaw 312.

Alignment tool 300 comprises spacer 360 hingedly coupled to an inner side of first jaw 312. Spacer 360 may be hinged between a first position abutting the inner side of first jaw 312 and a second position abutting body 302. In some embodiments, body 302 defines a recess 362 within which spacer 360 is mounted.

Spacer 360 may be hinged to the first position to raise alignment tool 300 when alignment tool 300 is coupled to a pile cap. In some embodiments, spacer 360 is approximately 3 centimeters thick to raise alignment tool 300 by 3 centimetres when spacer 360 is hinged to the first position.

Figure 4A:
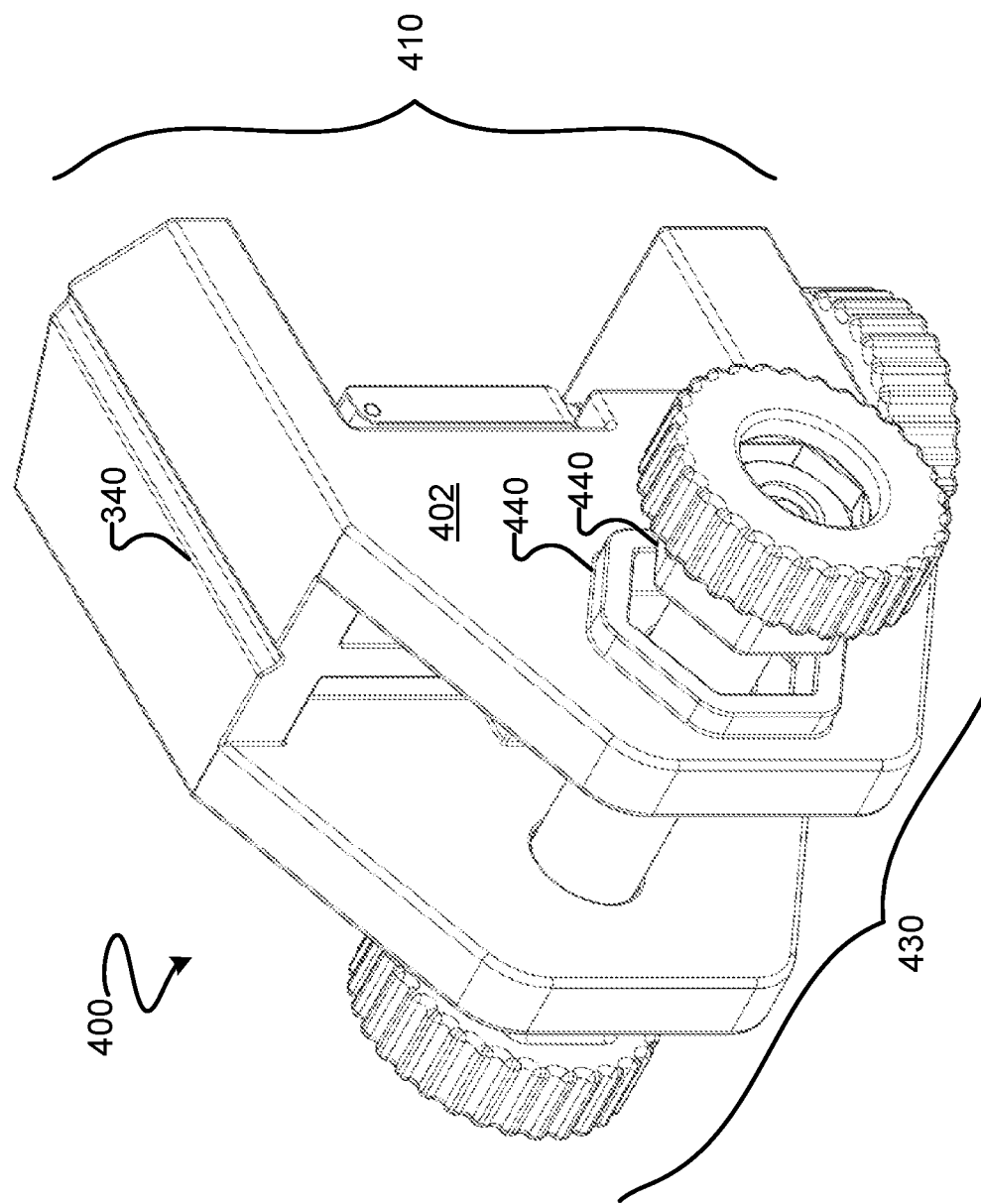
FIGS. 4A and 4B are perspective views of an alignment tool according to another example embodiment.
Figure 4B:
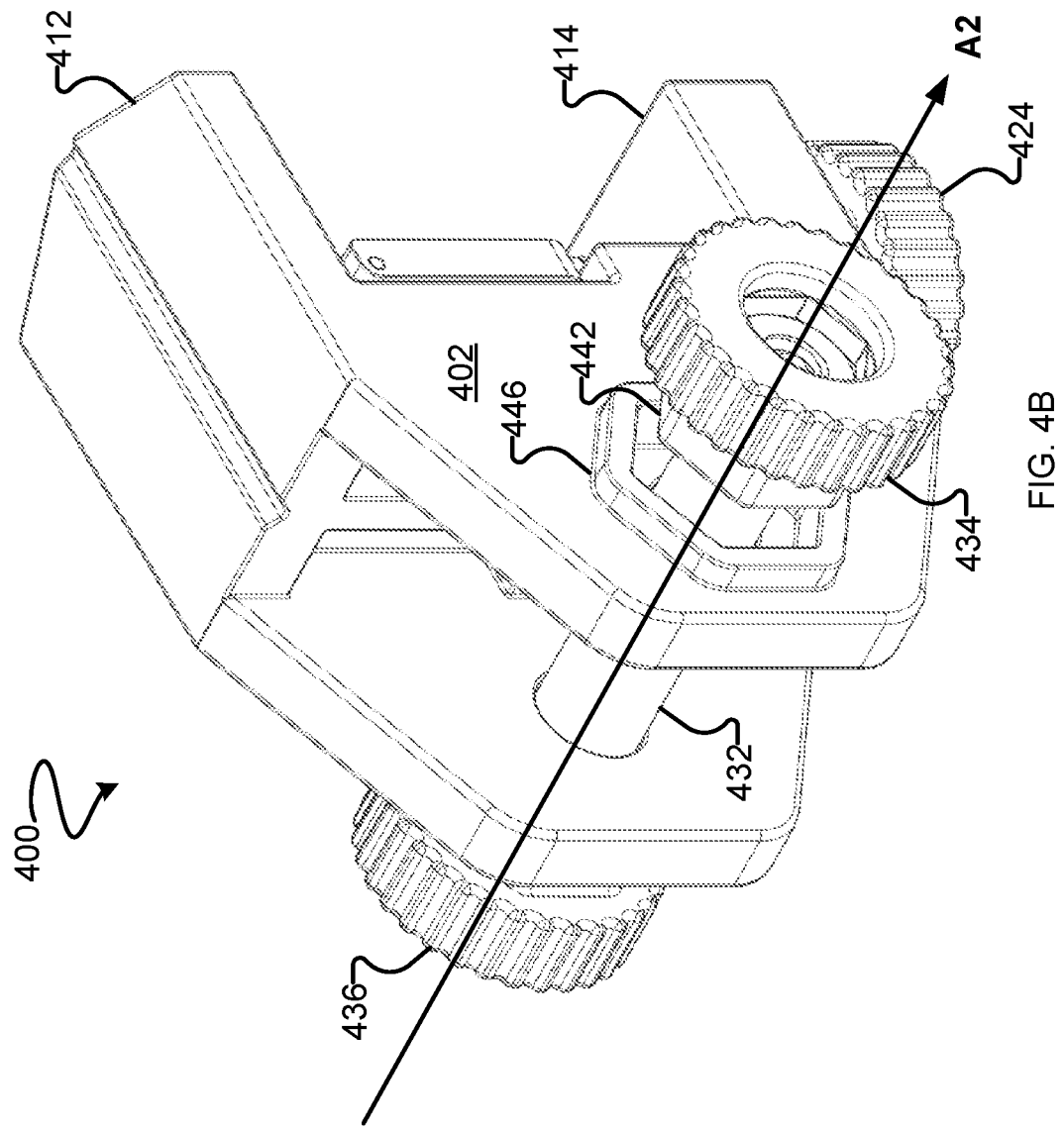
Figure 4C:
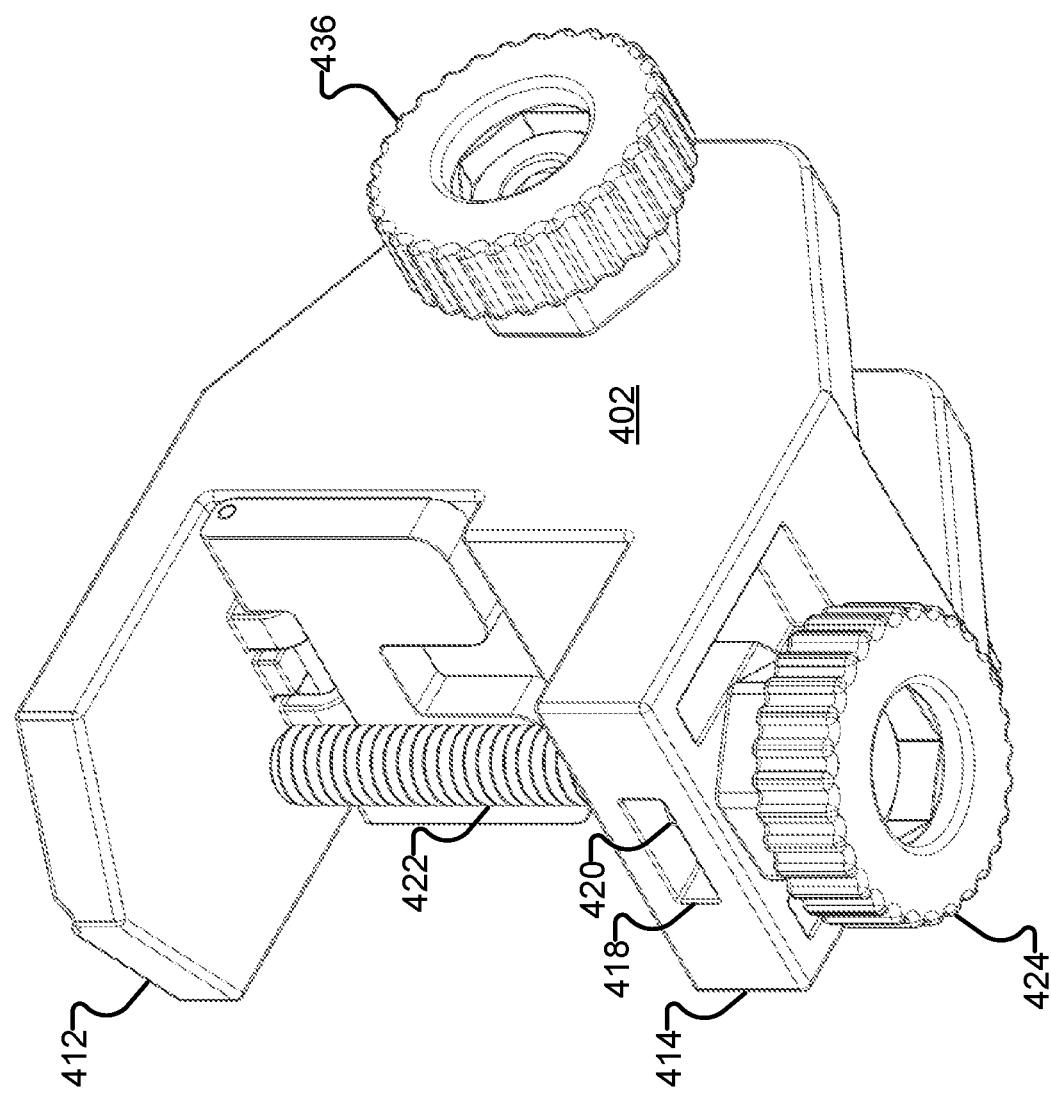
FIG. 4C is a further perspective view of the alignment tool depicted in FIGS. 4A and 4B.
Figure 4D:
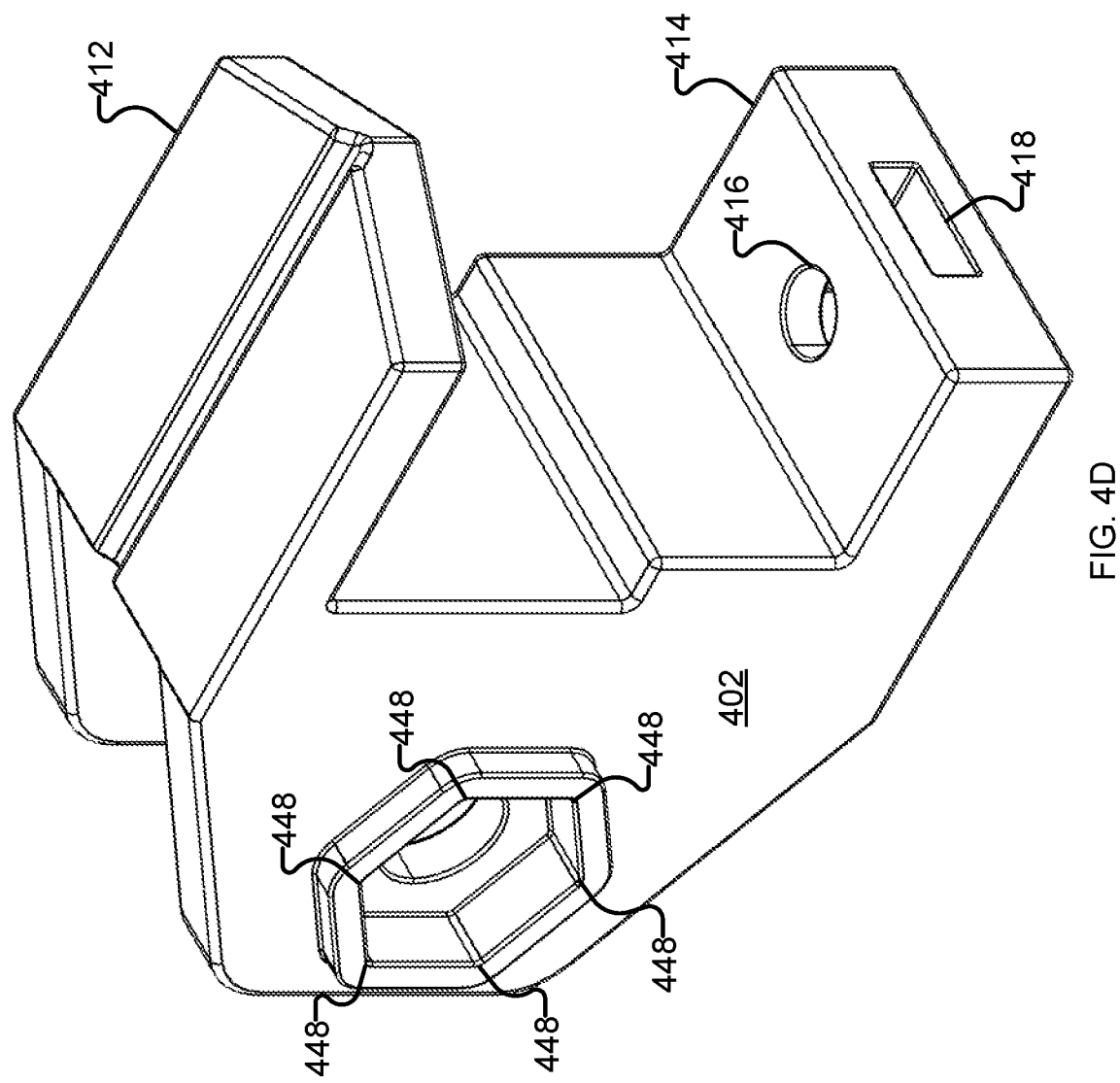
FIG. 4D is a perspective view of a body, first jaw and second jaw of the alignment tool depicted in FIGS. 4A to 4C.
Figure 4E:
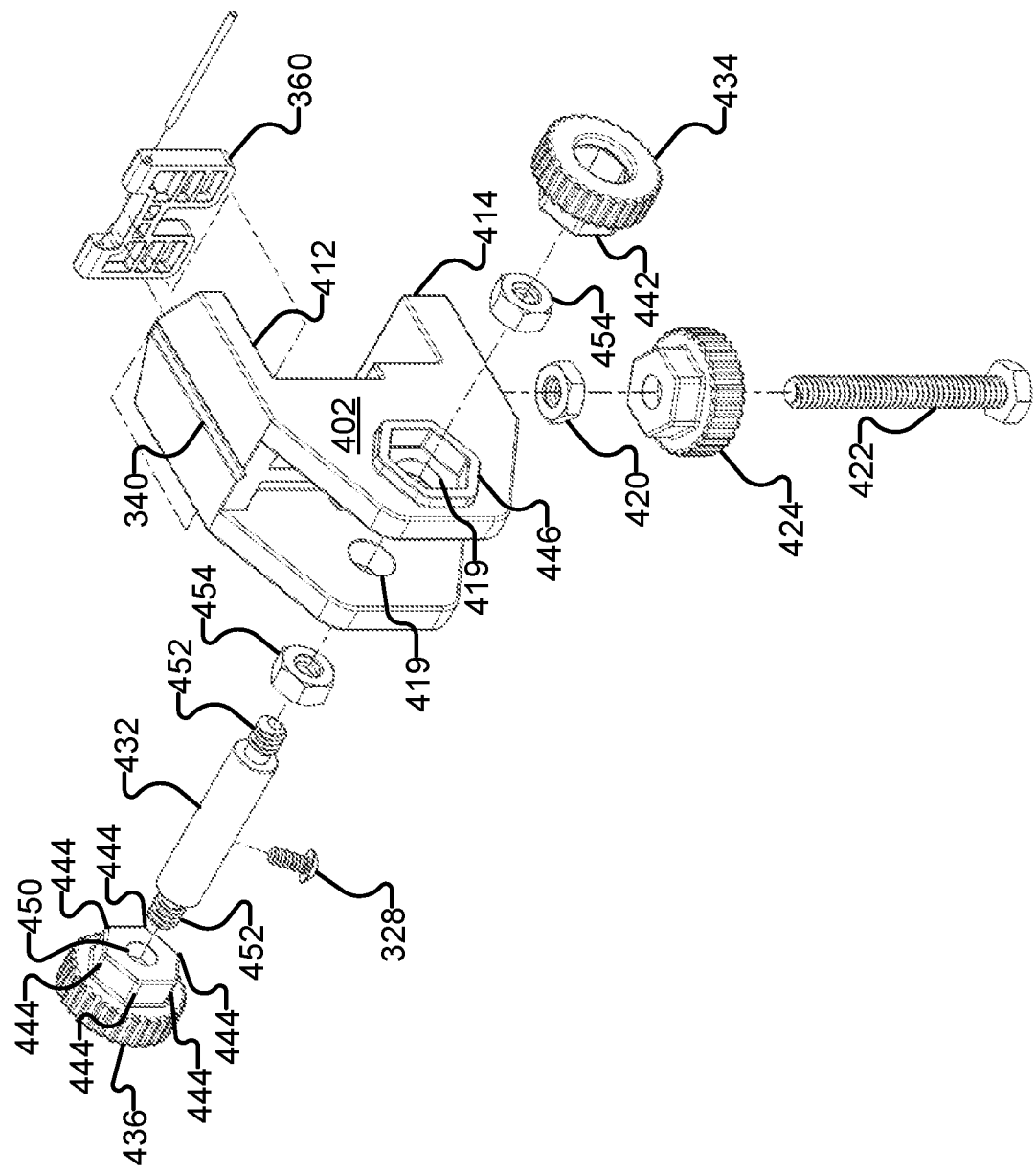
FIG. 4E is an exploded view of the alignment tool depicted in FIGS. 4A to 4D.

FIGS. 4A and 4B are perspective views of an alignment tool 400 according to a further example embodiment. FIG. 4C is a further perspective view of the alignment tool depicted in FIGS. 4A and 4B. FIG. 4E is an exploded view of the alignment tool depicted in FIGS. 4A to 4C. Elements of alignment tool 400 that are similar to elements of alignment tool 300 are referred to using the same reference numerals. Alignment tool 400 comprises body 402, pile cap fastener 410, tensioner 430, and cord guide 340.

Pile cap fastener 410 comprises first jaw 412 and second jaw 414 coupled to body 402. First jaw 412 opposes second jaw 414.

FIG. 4C is a perspective view of body 402, first jaw 412, and second jaw 414. In some embodiments, second jaw 414 defines aperture 416 and recess 418 intersecting aperture 416. Nut 420 is set within recess 418 intersecting aperture 416. Recess 418 holds nut 420 against rotation about an axis intersecting the center of aperture 416.

Bolt 422 passes through aperture 416 and is threaded through nut 420. As nut 420 is held against rotation, bolt 422 is advanced through aperture 416 by screwing bolt 422 through nut 420.

A pile cap may be received between first jaw 412 and second jaw 414. Bolt 422 may then be advanced through aperture 416 towards the pile cap between first jaw 412 and second jaw 414 until bolt 422 contacts the pile cap. Bolt 422 may then be further advanced through aperture 416 towards the pile cap to apply a force on the pile cap, thereby coupling alignment tool 400 to the pile cap.

In some embodiments, knob 424 is attached to bolt 422. Knob 424 may amplify a torque applied on knob 424 to a torque on bolt 422.

In some embodiments, first jaw 412 is larger than second jaw 414. For example, first jaw 412 may extend further from body 402 than second jaw 414. In such embodiments, first jaw 412 may extend further along a top side of the pile cap than second jaw 414 extends along a bottom side of the pile cap when alignment tool 400 is coupled to the pile cap.

Tensioner 430 comprises drum 432, first knob 434, second knob 436, cord retention member 328, and drum lock 440.

Drum 432 is rotatably mounted to body 402 to rotate about axis A2, and slide along axis A2. First knob 434 is mounted to a first end of drum 432, and second knob 436 is mounted to a second end of drum 432. Drum 432 may be rotated about axis A2 by rotating one or both of first knob 434 and second knob 436 about axis A2. Drum 432 may be slid along axis A2 by sliding one or both of first knob 434 and second knob 434 along axis A2.

Body 402 defines one or more drum apertures 419, and drum 432 is mounted through drum apertures 419. Drum 432 extends through drum apertures 419, and first knob 434 and second knob 436 are mounted to respective ends of drum 432 extending through drum apertures 419.

Drum lock 440 locks rotation of drum 432 about axis A2. In some embodiments, drum lock 440 comprises at least one knob projection 442 mounted to first knob 434 and extending towards body 402. Knob projection 442 has at least one corner. In the example embodiment depicted in FIGS. 4A to 4E, knob projection 442 has six knob corners 444.

Body 402 comprises at least one body projection 446. Body projection 446 has at least one corner. In the example embodiment depicted in FIGS. 4A to 4E, body projection 446 has six body corners 448.

Body projection 446 is configured to engage knob projection 442 when first knob 434 is slid along axis A2 towards body 402. Body projection 446 engages knob projection 442 by one or more of knob corners 444 aligning with one or more of body corners 448 and the sides and/or corners 448 of body projections 446 and the sides and/or corners 444 of knob projections 442 abutting one another.

Drum 432 may be released from a locked position by sliding first knob 434 along axis A2 away from body 402 to disengage knob projection 442 from body projection 446. When knob projection 442 is disengaged from body projection 446, drum 432 and first knob 434 are free to rotate about axis A2.

To tension a cord, the cord is wound around drum 432 until tension is applied to the cord by the winding of the cord, then rotation of drum 432 is locked by engaging knob projection 442 with body projection 446.

In some embodiments, knob projection 442 comprises six sides forming six corners 444. Where a length of each of the sides of knob projection 442 are equal, and an angle of each of corners 444 are equal, knob projection 442 forms a hexagon, as depicted in FIGS. 4A to 4E.

Body projection 446 may comprise six sides forming six corners 448. Where a length of each of the sides of body projection 446 are equal, and an angle of each of corners 448 are equal, body projection 446 forms a hexagon, as depicted in FIGS. 4A to 4E.

Where both knob projection 442 and body projection 446 form hexagons, knob projection 442 may be engaged with body projection 446 by aligning corners 444 with corners 448, and sliding knob projection 442 into body projection 446. When knob projection 442 is within body projection 446, rotation of drum 432 about axis A2 is arrested by corners 444 of knob projection 442 abutting the sides of body projection 446.

In some embodiments, a length of the sides of knob projection 442 is less than a length of the sides of body projection 446. In such embodiments, knob projection 442 is configured to engage body projection 446 by knob projection 442 sliding into body projection 446.

In some embodiments, a length of the sides of knob projection 442 is greater than a length of the sides of body projection 446. In such embodiments, knob projection 442 is configured to engage body projection 446 by body projection 446 sliding into knob projection 442. In such embodiments, when body projection 446 is within knob projection 442, rotation of drum 432 about axis A2 is arrested by corners 448 of body projection 446 abutting the sides of knob projection 442.

In some embodiments, knob 434 defines mounting aperture 450, and drum 432 has one or more threaded pegs 452. In such embodiments, knob 434 may be mounted to drum 432 by inserting one of threaded pegs 452 through mounting aperture 450 and screwing nut 454 onto threaded peg 452.

In some embodiments, knob projection 442 is integrally formed with knob 434. In some embodiments, body projection 446 is integrally formed with body 402.

In some embodiments, knobs 424, 434 and 436 are formed by injection moulding. Where knobs 424, 434 and 436 are formed by injection moulding, knobs 424, 434 and 436 may each be formed from the same mould.

In some embodiments, one or more features of alignment tool 300 are combined with one or more features of alignment tool 400.

In some embodiments:
- first jaw 312, 412 extends between 3 centimeters and 5 centimeters from body 302, 402;
- first jaw 312, 412 is between 0.25 centimeters and 1 centimeter thick;
- second jaw 314, 414 extends between 1 centimeter and 3 centimeters from body 302, 402;
- second jaw 314, 414 is between 0.5 centimeters and 2 centimeters thick;
- first jaw 312, 412 and second jaw 314, 414 are coupled to body 302, 402 between 3 centimeters and 5 centimeters apart;
- body 302, 402 is between 3 centimeters and 5 centimeters long;
- body 302, 402 is between 4 centimeters and 6 centimeters high;
- body 302, 402 is between 3 centimeters and 5 centimeters wide; and/or tensioner 320, 430 extends between 2 centimeters and 5 centimeters from body 302, 402.

In some embodiments, a height of pile cap 350 is between 2 centimeters and 4 centimeters.

In some embodiments, one or more of corners 442 and 448 are rounded.

In some embodiments, one or more parts of alignment tool 300, 400 comprise plastic or metal. For example:
- body 302, 402 may comprise plastic, aluminum, or steel;
- first jaw 312, 412 may comprise plastic, aluminum, or steel;
- second jaw 314, 414 may comprise plastic, aluminum, or steel;
- knobs 324, 326, 424, 434 and/or 436 may comprise plastic, aluminum, or steel; and/or
- thump screw 318, nut 420, nuts 454, and/or bolt 422 may comprise metal, for example aluminum or steel.

In some embodiments, first jaw 312, 412 and/or second jaw 314, 414 may be integrally formed with body 302, 402. In some embodiments, first jaw 312, 412 and/or second jaw 314, 414 are attached to body 302, 402, for example by fasteners, welding, or adhesive.

One or more embodiments of an alignment tool are described herein in the context of pile caps for building foundations. However, the alignment tool described herein is not limited in application to pile caps, and may be used in other applications. For example, the alignment tool described herein may be used in any area of construction wherein cords must be drawn along a line, and the alignment tool may be fastened to a static object along the line.

Interpretation of Terms

Unless the context clearly requires otherwise, throughout the description and the "comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

The invention claimed is:

1. An alignment tool for a pile cap, the alignment tool comprising:
   a tensioner configured to apply tension to a cord;
   a pile cap fastener coupled to the tensioner; and
   a cord guide coupled to the fastener;
   wherein the cord guide is configured to guide a cord under tension by the tensioner
   wherein the tensioner comprises a winch.

2. The alignment tool according to claim 1, wherein the winch comprises:
   a body;
   a drum rotatably coupled to the body;
   a first knob coupled to the drum; and
   a drum lock configured to stop rotation of the drum relative to the body.

3. The alignment tool according to claim 2, wherein:
   the drum is axially slidably coupled to the body;
   the body defines at least one aperture; and
   the drum lock comprises a projection coupled to the first knob and configured to engage the aperture by axially sliding the drum.

4. The alignment tool according to claim 3, wherein:
   the body defines four or more apertures; and
   the projection is configured to engage any one of the apertures by rotating the drum to align the projection with a one of the apertures, and axially sliding the drum to insert the projection into the one of the apertures.

5. The alignment tool according to claim 4, wherein:
   the apertures are each substantially circular in cross-section and each have a substantially equal first diameter; and
   the projection is substantially circular in cross-section and has a second diameter, wherein the second diameter is less than the first diameter.

6. The alignment tool according to claim 2, wherein:
   the drum is axially slidably coupled to the body;
   the body comprises at least one body projection having at least one corner; and
   the drum lock comprises a knob projection coupled to the first knob and having at least one corner;
   wherein the knob projection is configured to engage the body projection by rotating the drum to align the corner of the knob projection with the corner of the body projection, and axially sliding the drum to insert the knob projection into the body projection.

7. The alignment tool according to claim 6, wherein:
   the body projection has six corners and forms a hexagon with sides of a first length; and
   the knob projection has six corners and forms a hexagon with sides of a second length, wherein the second length is less than the first length.

8. The alignment tool according to claim 7, wherein the corners of the body projection are rounded, and the corners of the knob projection are rounded.

9. The alignment tool according to claim 6, wherein:
   the body projection has six corners and forms a hexagon with sides of a first length; and
   the knob projection has six corners and forms a hexagon with sides of a second length, wherein the second length is greater than the first length.

10. The alignment tool according to claim 2, wherein the first knob is coupled to a first end of the drum, and the winch comprises a second knob coupled to a second end of the drum opposite the first end of the drum.

11. An alignment tool for a pile cap, the alignment tool comprising:
    a tensioner configured to apply tension to a cord;
    a pile cap fastener coupled to the tensioner; and
    a cord guide coupled to the fastener;
    wherein the cord guide is configured to guide a cord under tension by the tensioner
    wherein the pile cap fastener comprises:

a first jaw; and a second jaw opposed the first jaw and configured to apply pressure towards the first jaw.

12. The alignment tool according to claim 11, wherein the pile cap fastener further comprises a thumb screw configured to screw through the second jaw towards the first jaw.

13. The alignment tool according to claim 11, wherein:

the second jaw defines an aperture and a recess intersecting the aperture; and the pile cap fastener further comprises:

a nut inside the recess and aligned with the aperture;

a bolt passing through the aperture and threaded through the nut; and a third knob attached to the bolt;

wherein the bolt is configured to screw through the nut and the second jaw towards the first jaw by rotating the third knob.

14. The alignment tool according to claim 13, wherein:

the body, the first jaw, the second jaw, the first knob, the second knob, the third knob, and the drum lock comprise plastic; and the nut and the bolt comprise metal.

15. The alignment tool according to claim 11, wherein the pile cap fastener comprises a spacer hingedly coupled to the first jaw.

16. The alignment tool according to claim 11, wherein the cord guide comprises a channel along the first jaw.

17. The alignment tool according to claim 16, wherein the channel runs along the first jaw substantially perpendicular to an opening between the first jaw and the second jaw.

18. An alignment tool comprising:

a body;

a first jaw coupled to the body and having a first side and a second side opposed to the first side;

a second jaw coupled to the body opposing the second side of the first jaw and defining a threaded aperture;

a spacer hingedly coupled to the second side of the first jaw;

a thumb screw screwed through the threaded aperture;

a drum mounted to the body, wherein the drum is rotatable about a first axis and slideable along the first axis;

a cord retention member coupled to the drum;

a channel defined by the first side of the first jaw and substantially perpendicular to the first axis;

a first knob coupled to a first end of the drum; and a projection coupled to the first knob, wherein the projection extends from the first knob towards the body and along the first axis;

wherein the body defines a second aperture configured to receive the projection when the first knob is slid along the first axis towards the body and to resist rotation of the drum about the first axis when the projection is received within the second aperture.

19. An alignment tool comprising:

a body;

a first jaw coupled to the body and having a first side and a second side opposed to the first side;

a second jaw coupled to the body opposing the second side of the first jaw and defining an aperture and a recess intersecting the aperture;

a spacer hingedly coupled to the second side of the first jaw;

a nut inside the recess and aligned with the aperture;

a bolt passing through the aperture and screwed through the bolt;

a drum mounted to the body, wherein the drum is rotatable about a first axis and slideable along the first axis;

a cord retention member coupled to the drum;

a channel defined by the first side of the first jaw and substantially perpendicular to the first axis;

a first knob coupled to a first end of the drum;

a knob projection coupled to the first knob having six corners and forming a hexagon extending towards the body; and a body projection coupled to the body having six corners and forming a hexagon extending towards the first knob;

wherein the knob projection is configured to engage the body projection by rotating the drum to align the corners of the knob projection with the corners of the body projection, and axially sliding the drum to slid the knob projection within the body projection.

* * * * *